C. F. FREDE.
SUPPORT FOR AXLE DRIVEN LIGHT GENERATORS.
APPLICATION FILED MAY 5, 1913.
1,105,265.
Patented July 28, 1914.
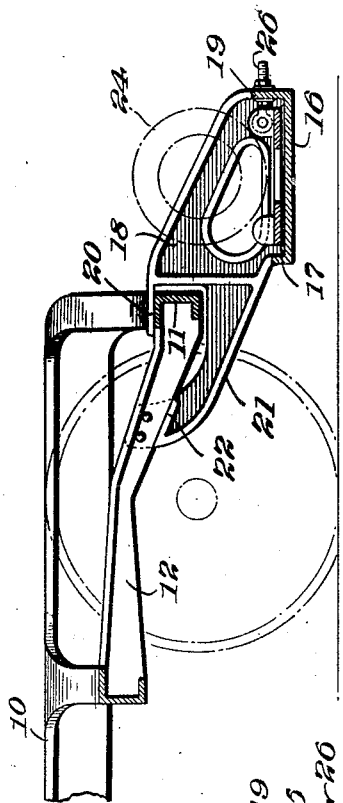
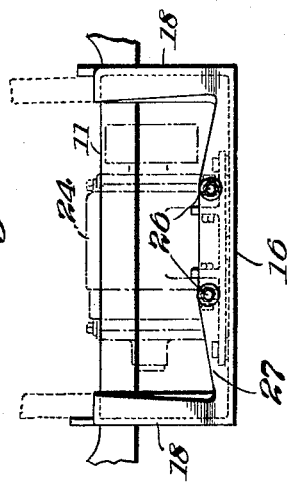
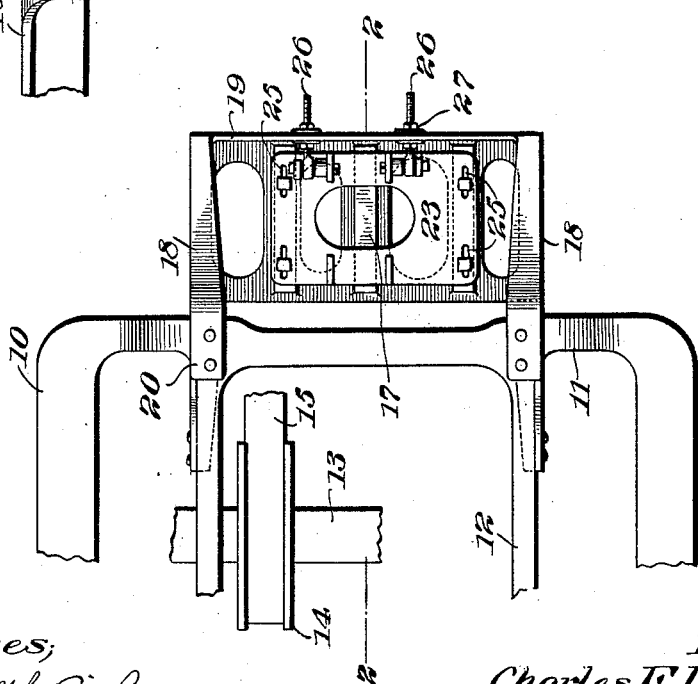
Witnesses;
Inventor;
Charles F. Frede,
By

UNITED STATES PATENT OFFICE.

CHARLES F. FREDE, OF ST. LOUIS, MISSOURI, ASSIGNOR TO DOUBLE BODY BOLSTER COMPANY, OF ST. LOUIS, MISSOURI, A CORPORATION OF NEW JERSEY.

SUPPORT FOR AXLE-DRIVEN LIGHT-GENERATORS.

1,105,265. Specification of Letters Patent. Patented July 28, 1914.

Application filed May 5, 1913. Serial No. 765,662.

*To all whom it may concern:*

Be it known that I, CHARLES F. FREDE, a citizen of the United States, residing at the city of St. Louis, State of Missouri, have invented a certain new and useful Improvement in Supports for Axle-Driven Light-Generators, of which the following is a full, clear, and exact description, such as will enable others skilled in the art to which it appertains to make and use the same, reference being had to the accompanying drawings, forming part of this specification, in which—

Figure 1 is a top plan view of a support for axle driven dynamo of my improved construction. Fig. 2 is a sectional view taken approximately on the line 2—2 of Fig. 1. Fig. 3 is an end elevational view of the support applied to a truck frame.

My invention relates to a support for the axle driven generator of a train lighting system, the principal object of my invention being to construct a support in a single piece preferably by casting, and which support is provided with arms and brackets which interlock with parts of the truck frame so as to provide a strong substantial and compact support for the dynamo or generator.

A further object of my invention is to combine with the support, a plate which forms the base of the generator and which plate is readily adjustable upon the support so that the belt from the pulley on the axle to the generator pulley can be readily tightened without detaching the supporting fixture and without detaching the belt fasteners.

To the above purpose my invention consists in certain novel features of construction and arrangement of parts hereinafter more fully described and claimed.

Referring by numerals to the accompanying drawings, 10 designates the wheel pieces of the truck frame, 11 the end rail thereof, 12 the wheel guards, 13 one of the axles of the truck, 14 a pulley fixed on said axle, and 15 a belt which operates on said pulley.

The generator support as contemplated by my invention is preferably formed in a single piece by casting, and comprises a horizontally disposed base plate 16 which, if desired, may be perforated in order to decrease weight and formed on top of this plate is a series of bearing ribs 17, the top surfaces of which are preferably machine finished in order that the base plate of the generator will readily slide thereon. Formed integral with or fixed to the ends of the plate 16 are vertically disposed plates or brackets 18, and extending along the front edge of the plate 16 between these brackets is a vertically disposed flange 19. Formed integral with the upper rear corners of the brackets 18 are horizontally disposed plates 20 which overlie and are fixed to the end rail 11 of the truck frame. Formed integral with the lower rear portions of the brackets 18 are outwardly and upwardly projecting arms 21. the ends of which bear directly against the outer faces of the wheel guards 12. Suitable fastening devices such as rivets are seated in the rear ends of these arms 21 and in the wheel guards 12. Formed integral with the arms 21 and bearing directly against the undersides of the wheel guards are plates 22. The plate 20 on the upper rear corners of the brackets 18 engaging on top of the end rail 11 and the plates 22 bearing against the undersides of the wheel pieces 12 supports the plate 16 and parts carried thereby in cantaliver fashion from the end of the truck frame, and such arrangement materially reduces the shearing strains upon the rivets or fastening devices utilized for attaching the support to the truck frame. Positioned on the bearing ribs 17 of the plate 16 is a plate 23 which is adapted to serve as a base plate for the dynamo or generator 24. Formed through this base plate 23 near its ends are slots 25 through which pass bolts 26, the threaded ends of which are seated in suitable threaded apertures formed in the plate 16.

This construction permits the plate 23 to be adjusted backward or forward upon the plate 16, and positively locked after adjustment.

Pivotally connected to the front of the plate 23 are the heads of bolts 26 which pass through suitably located apertures in the flange 19 and mounted on said bolts on both sides of the flange 19 are nuts 27.

The construction just described provides means for moving the plate 23 and the dynamo carried thereby backward and forward and after movement the plate and parts carried thereby can be locked by tightening both sets of nuts against the flange 19.

A support of my improved construction is comparatively simple, interlocks with the truck frame so as to be supported therefrom in cantaliver fashion, is preferably formed in a single piece by casting, and therefore can be produced at comparatively little cost, and the base plate combined with the support can readily be adjusted on said support whenever it is desired to tighten the belt between the pulley on the generator and the pulley on the axle.

It will be readily understood that minor changes in the size, form and construction of the various parts of my improved support can be made and substituted for those herein shown and described, without departing from the spirit of my invention, the scope of which is set forth in the appended claims.

I claim:

1. An axle driven light generator support comprising a plate, and brackets on the ends thereof, which brackets extend rearwardly from the plate and are adapted to interlock with a truck frame.

2. An axle driven light generator support comprising a plate, brackets on the ends thereof, which brackets extend rearwardly from the plate and are adapted to interlock with a truck frame, and a dynamo base plate adjustably mounted on the first mentioned plate.

3. An axle driven generator support comprising a plate, brackets on the ends thereof, parts of which brackets are adapted to engage over and be attached to a part of a truck frame and other parts of which brackets are adapted to engage beneath and be attached to parts of the truck frame.

4. An axle driven light generator support comprising a plate, brackets on the ends thereof, which brackets extend rearwardly from the plate and are adapted to interlock with a truck frame, a dynamo base plate arranged for sliding movement upon the first mentioned plate, and means for adjusting the position of said dynamo base plate.

5. An axle driven light generator support comprising a plate, brackets on the ends thereof, which brackets extend rearwardly from the plate and are adapted to interlock with a truck frame, a dynamo base plate arranged for sliding movement upon the first mentioned plate, means for adjusting the position of said dynamo base plate, and means for locking the dynamo base plate to the first mentioned plate after said dynamo base plate has been adjusted in position.

6. An axle driven generator support comprising a base plate, brackets on the ends thereof, plates on said brackets, which are adapted to engage over a part of a truck frame, and plates on said brackets which are adapted to engage beneath parts of the truck frame.

7. An axle driven generator support comprising a plate, brackets on the ends thereof, which brackets extend rearwardly from the plate and are adapted to interlock with a truck frame, a flange on the front of the plate, a dynamo base plate mounted for sliding movement on the first mentioned plate, and bolts connected to said dynamo base plate, which bolts pass through the flange on the first mentioned base plate.

8. The combination with a truck frame, of an axle driven generator support comprising a plate, brackets thereon, portions of which brackets overlie and are fixed to a part of the truck frame, and parts of which brackets bear against and are fixed to parts of the truck frame.

9. An axle driven generator support formed in a single piece, and comprising a plate, brackets on the ends of said plate, and extensions on said brackets which extensions are formed in oppositely arranged pairs and adapted to be fixed to parts of a truck frame.

10. An axle driven generator support formed in a single piece, and comprising a plate, brackets on the ends thereof, and opposite arranged pairs of car truck engaging members integral with said brackets.

11. An axle driven generator support comprising a plate, oppositely arranged pairs of extensions on the ends of said plate, which pairs of extension are adapted to engage and be fixed to parts of a truck frame, and adjustable means on said plate for supporting a generator.

In testimony whereof I hereunto affix my signature in the presence of two witnesses, this 2nd day of May, 1913.

CHARLES F. FREDE.

Witnesses:
 HAL C. BELLVILLE,
 FRED H. BLANKENHORN.

---

Copies of this patent may be obtained for five cents each, by addressing the "Commissioner of Patents, Washington, D. C."